US011210855B2

(12) United States Patent
Kim

(10) Patent No.: US 11,210,855 B2
(45) Date of Patent: Dec. 28, 2021

(54) ANALYZING 2D MOVEMENT IN COMPARISON WITH 3D AVATAR

(71) Applicant: Ssam Sports, Inc., Allendale, NJ (US)

(72) Inventor: Sang J. Kim, Allendale, NJ (US)

(73) Assignee: Ssam Sports, Inc., Allendale, NJ (US)

(*) Notice: Subject to any disclaimer, the term of this patent is extended or adjusted under 35 U.S.C. 154(b) by 15 days.

(21) Appl. No.: 16/458,778

(22) Filed: Jul. 1, 2019

(65) Prior Publication Data
US 2020/0005544 A1 Jan. 2, 2020

Related U.S. Application Data

(60) Provisional application No. 62/692,395, filed on Jun. 29, 2018.

(51) Int. Cl.
| | |
|---|---|
| *G06T 19/00* | (2011.01) |
| *G06T 13/40* | (2011.01) |
| *H04N 5/272* | (2006.01) |
| *G06T 7/20* | (2017.01) |
| *G11B 27/031* | (2006.01) |
| *G09B 19/00* | (2006.01) |
| *G09B 5/02* | (2006.01) |

(52) U.S. Cl.
CPC ............ *G06T 19/006* (2013.01); *G06T 7/20* (2013.01); *G06T 13/40* (2013.01); *G09B 5/02* (2013.01); *G09B 19/0038* (2013.01); *G11B 27/031* (2013.01); *H04N 5/272* (2013.01); *G06T 2200/24* (2013.01); *G06T 2207/10016* (2013.01); *G06T 2207/30196* (2013.01); *G06T 2207/30204* (2013.01); *G06T 2207/30221* (2013.01); *G06T 2210/62* (2013.01); *H04N 2005/2726* (2013.01)

(58) Field of Classification Search
None
See application file for complete search history.

(56) References Cited

U.S. PATENT DOCUMENTS

| | | | | |
|---|---|---|---|---|
| 7,457,439 | B1* | 11/2008 | Madsen | G06T 7/246 348/154 |
| 8,488,888 | B2* | 7/2013 | Balan | G06F 3/011 382/224 |
| 9,154,739 | B1* | 10/2015 | Nicolaou | G16H 20/30 |
| 9,195,304 | B2* | 11/2015 | Shimomura | G06F 3/0304 |
| 9,607,399 | B2* | 3/2017 | Behan | G11B 27/02 |
| 9,747,722 | B2* | 8/2017 | Adler | H04N 13/275 |
| 10,134,296 | B2* | 11/2018 | Anderson | G06T 11/00 |

(Continued)

*Primary Examiner* — Jason A Pringle-Parker
(74) *Attorney, Agent, or Firm* — Lowenstein Sandler LLP

(57) ABSTRACT

A processing device receive a two dimensional (2D) video recording of a subject user performing a physical activity and provides a three dimensional (3D) visualization comprising a virtual avatar performing the physical activity. The processing device causes display of the 3D visualization comprising the virtual avatar at a first key point in performing the physical activity, receives first user input to advance the 2D video recording to a first position corresponding the first key point, and receives second user input comprising a first synchronization command. In response, the processing device generates a first synchronization marker to indicate the first position in the 2D video recording corresponding to the first key point.

13 Claims, 6 Drawing Sheets

(56) References Cited

U.S. PATENT DOCUMENTS

| | | | | |
|---|---|---|---|---|
| 2002/0064764 | A1* | 5/2002 | Fishman | A63B 24/0003 434/252 |
| 2010/0022351 | A1* | 1/2010 | Lanfermann | A63B 24/0006 482/1 |
| 2011/0275045 | A1* | 11/2011 | Bhupathi | G09B 19/003 434/247 |
| 2011/0306398 | A1* | 12/2011 | Boch | A63F 13/5375 463/7 |
| 2012/0190505 | A1* | 7/2012 | Shavit | A63B 71/0622 482/8 |
| 2012/0206577 | A1* | 8/2012 | Guckenberger | G09B 19/003 348/47 |
| 2013/0072353 | A1* | 3/2013 | Alessandri | A63B 24/0006 482/8 |
| 2013/0225305 | A1* | 8/2013 | Yang | A63F 13/285 473/152 |
| 2016/0256740 | A1* | 9/2016 | Rowe | G06T 7/66 |

* cited by examiner

ANALYZING 2D MOVEMENT IN COMPARISON WITH 3D AVATAR

RELATED APPLICATIONS

This application claims the benefit of U.S. Provisional Patent Application No. 62/692,395, filed Jun. 29, 2018, the entire contents of which are hereby incorporated by reference herein.

TECHNICAL FIELD

The present disclosure is generally related to computer systems, and is more specifically related to systems and methods for analyzing 2D movement in comparison with a 3D avatar.

BACKGROUND

Two dimensional (2D) video is widely used by instructors and consumers to try to analyze and improve human motion in sports and health applications because 2D video is simple, cheap and widely available. Three dimensional (3D) motion visualization is much more advanced and provides data, multiple viewing angles, and digital data analysis that 2D video cannot provide. 3D systems can provide useful information of angles, speed, etc. which can be used to identify poor movement for performance or health. 3D motion visualization, however, requires sensors or markers and technology that takes longer to set up and is more expensive.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
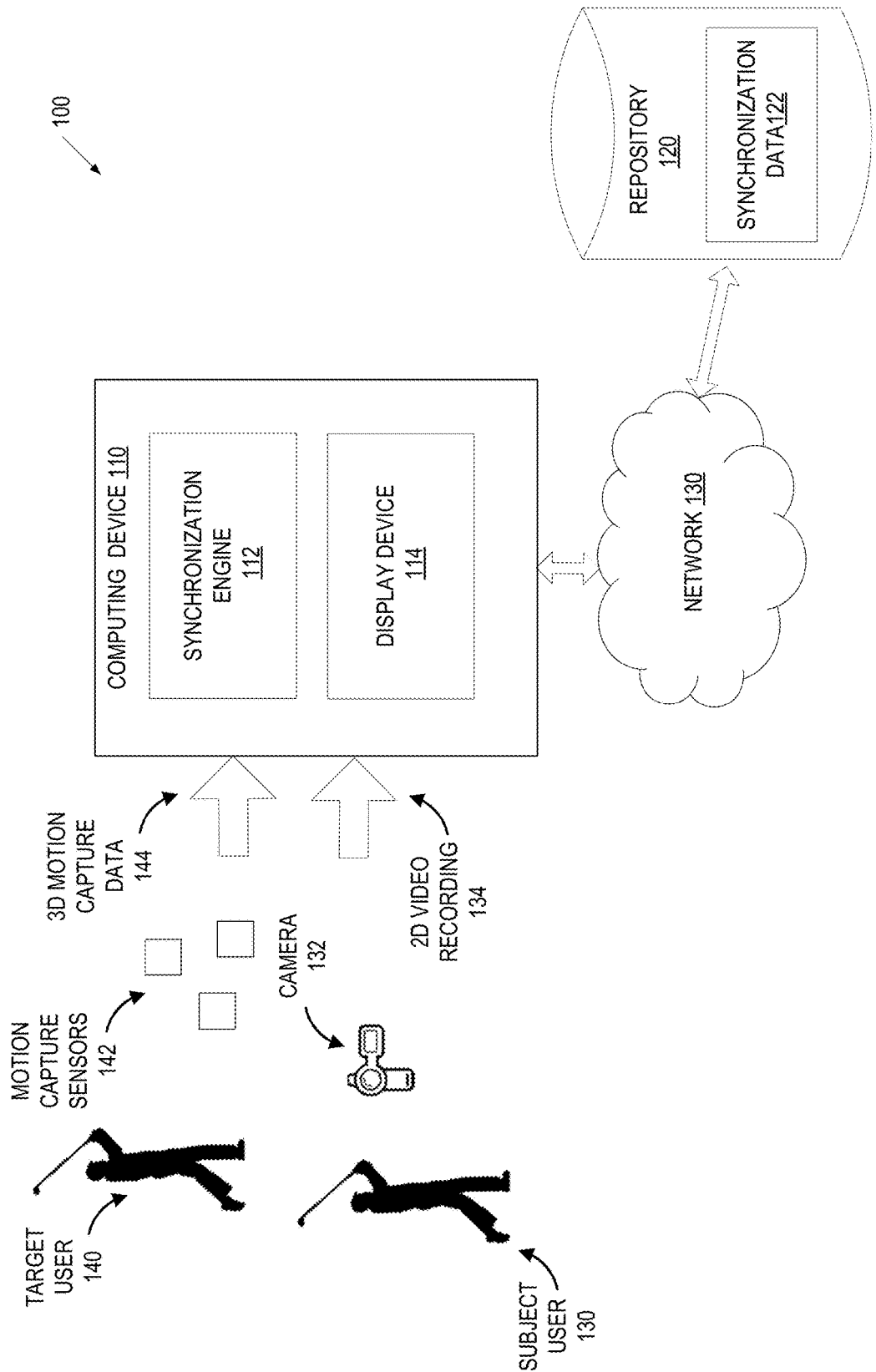
FIG. 1 depicts a high-level component diagram of an illustrative system architecture, in accordance with one or more aspects of the present disclosure.

Embodiments for analyzing 2D movement in comparison with a 3D avatar are described herein. In one embodiment, a system and technology for comparing human movement captured in 2D video against a 3D avatar representing a target or ideal motion is described. By overlaying the 2D video with an idealized 3D avatar, the system allows a user to more clearly see where they differ from the target motion and how they can improve. The system utilizes synchronization technologies to overlay the 2D video with the 3D avatar so that the movements of the user and of the target motion can be seen together and clearly differentiated. The 3D overlay can include any number of analytics, tools, and data that 3D motion capture technology provides on top of the 2D video.

Conventional 2D video is simple, cheap and widely available, however, the analysis that can be performed using 2D video alone is limited. 3D motion visualization is much more advanced and provides data, multiple viewing angles, and digital data analysis that 2D video cannot provide. 3D motion visualization, however, requires sensors or markers and technology that takes longer to set up and is more expensive.

Aspects of the present disclosure address the above and other considerations by providing a system for comparison and analysis of human movement using a hybrid of 2D and 3D technologies. Embodiments of the system allow a user to capture their motion using simple 2D video recordings. For example, the user can capture a video of their motion from one or more angles. The user can then select a target 3D motion from a library of ideal or optimized motions. The user can provide criteria (e.g., user attributes) to select a motion to try to emulate based on types of movements, skill levels, similar body types, movement limitations and other human demographics. The system can then overlay the 2D and 3D recordings into a single view using 2D video and 3D animation processing technologies.

In one embodiment, the system provides a slider tool to provide the view of the 2D and 3D motions side by side or overlaid on top of each other. In one embodiment, the system provides a rotation tool to synchronize the viewing angle of the 3D recording with the 2D recording and a zoom tool to synchronize the sizes of the 2D and 3D human figures. Once synchronized, the system maintains the rotation angle and zoom size of the 3D avatar for future comparison.

In one embodiment, the system can synchronize the 2D video recording with the 3D motion visualization at one or more key points (e.g., the point of impact on a golf or baseball swing, the bottom point on a deep squat etc.). By synchronizing the 2D video recording with the 3D motion visualization at one or more key points, a user can see the different tempo and rhythm of their movement compared to the ideal 3D movement. The system can further synchronize the 2D video recording with the 3D motion visualization at multiple key points within the movement and then save this synchronization so that the 2D video recording and the 3D motion visualization can be compared simply by advancing both recordings step by step throughout the movement for comparison. These key points may include a series of mini-movements within a movement that can be detected using 3D motion capture data that a person will advance through in a given larger movement. For example, in a golf swing the club reaches parallel to the ground in the backswing, vertical with respect to the ground, reaches end of backswing, end of hip rotation in backswing, reaches vertical, horizontal, impact, horizontal in follow through, vertical in follow through, and finish. In other movements, it can be the angle, velocity, acceleration of a body part. In this way, a movement can be broken down into well-defined mini-movements so they can be compared with each other. A 3D motion capture can be programmed to automatically detect and advance to these key points. We can synchronize 2D video to the 3D avatar for comparison using these key points in a number of ways.

In one embodiment, the system can automatically synchronize the 2D video recording and the 3D motion visualization in cases where there is a clear object that can be detected by the video processing algorithms, such as a golf club, baseball bat, tennis racket, lacrosse stick, etc. and synchronize them automatically. In a manual synchronization process, the 3D avatar can be overlaid onto the 2D video, the 3D avatar can be advanced to a first key point, and a tool can be provided to the user to advance the 2D video recording to match that key point. Once there, a button can be provided to synchronize the 2D video and the 3D avatar at that key point. The system can track this point in the 2D video recording (e.g., using a synchronization marker) and associate that point with the key point in the 3D avatar. The 3D avatar can be moved to the next key point and the user can again advance the video until it matches the next key point and press the synchronization button again. The user can repeat this process until all the key points of the 2D video and the 3D avatar are synchronized. Once synchronized, the 2D video and 3D avatar can be moved together through the key points automatically.

Once synchronized the system allows for visual adjustments to the 3D avatar such as a skeleton mode or adjustments to the transparency of the avatar. In the skeleton mode, the view provides a skeletal model of the 3D avatar which differentiates well on a 2D human figure in a video recording without blocking each other out. This skeletal model provides for adjustments in skeleton color and thickness. In the avatar mode, a semi-transparent human avatar which can be overlaid but still distinguished from the human figure in the 2D video recording, is provided. This avatar model provides for adjustments in transparency level, color, and outline color and thickness for clear comparison.

In one embodiment, the system will further allow for data and visualization tools on the 3D avatar to provide for better analysis and training. For example, extension lines on body parts such as the hips and shoulder with rotation angles may be displayed, velocity, force, or acceleration lines on body segments may be displayed indicating the magnitude and direction of the velocities, or paths created by body parts or apparatus during performance of a motion may be displayed. In one embodiment, the system may hide or highlight different body parts on the 3D model to make the comparison more clear.

The comparison of the 2D video recording and the 3D visualization can be useful to the user in real time training scenarios. For example, the user can view live video showing real time human movement in comparison to a pre-recorded 3D avatar to train human movement. In one embodiment, the user can move the avatar to a specific position in a movement and try to position their own body in the same position. The user can move the avatar to a subsequent position and then try to position their body to this new position as well. The avatar acts as a guide and the user can move accordingly, facilitated by the overlay view described herein.

FIG. 1 depicts a high-level component diagram of an illustrative system architecture 100, in accordance with one or more aspects of the present disclosure. System architecture 100 includes a computing device 110 and a repository 120 connected to a network 130. Network 130 may be a public network (e.g., the Internet), a private network (e.g., a local area network (LAN) or wide area network (WAN)), or a combination thereof.

The computing device 110 may be configured to analyze 2D movement in comparison with a 3D avatar. In one embodiment, computing device 110 may be a desktop computer, a laptop computer, a smartphone, a tablet computer, a server, or any suitable computing device capable of performing the techniques described herein. In one embodiment, a plurality of motion capture sensors 142, which may be affixed to one or more body parts of a target user 140 while they are performing the physical activity, capture 3D motion capture data 144 corresponding to the target user 140. In other embodiments, the motion capture sensors 142 may be affixed to any relevant object being manipulated by the target user 140 while performing the physical activity, such as to a golf club, baseball bat, tennis racquet, can, crutches, prosthetics, etc. The 3D motion capture data 144 may be received by the computing device 110.

The 3D motion capture data 144 may be received in any suitable manner. For example, the motion capture sensors 142 may be wireless inertial sensors, each including for example, a gyroscope, magnetometer, accelerometer, and/or other components to measure sensor data including relative positional data, rotational data, and acceleration data. The 3D motion capture data 144 may include this sensor data and/or other data derived or calculated from the sensor data. The motion capture sensors 142 may transmit the 3D motion capture data 144 including, raw sensor data, filtered sensor data, or calculated sensor data, wirelessly to computing device 110 using internal radios or other communication mechanisms. In other embodiments, other systems may be used to capture 3D motion capture data 144, such as an optical system, using one or more cameras, a mechanical motion system, an electro-magnetic system, an infra-red system, etc. In addition, in other embodiments, the 3D motion capture data 144 may have been previously captured and stored in a database or other data store. In this embodiment, computing device 110 may receive the 3D motion capture data 144 from another computing device or storage device where the 3D motion capture data 144 is maintained. In still other embodiments, the 3D motion capture data 144 may be associated with other users besides or in addition to subject user 140 performing the physical activity.

In one embodiment, a camera 132 captures a 2D video recording 134 of a subject user 130 performing the physical activity. Data representing the 2D video recording 134 may be received by the computing device 110. The physical activity can be for example, swinging a golf club, throwing a ball, running, walking, jumping, sitting standing, or any other physical activity. When performing the physical activity, the subject user 130 and/or one or more target users 140 may make one or more body movements that together enable performance of the physical activity. For example, when swinging a golf club, the user may rotate their hips and shoulders, swing their arms, hinge their wrists, etc., each of which can be considered a separate body movement associated with performing the physical activity. Each physical activity may have its own unique set of associated body movements. In addition, in other embodiments, the 2D video recording 134 may have been previously captured and stored in a database or other data store. In this embodiment, computing device 110 may receive the 2D video recording 134 from another computing device or storage device where the 2D video recording 134 is maintained.

In one embodiment, computing device 110 may include a synchronization engine 112. The synchronization engine 112 may include instructions stored on one or more tangible, machine-readable storage media of the computing device 110 and executable by one or more processing devices of the computing device 110. In one embodiment, synchronization engine 112 receives the 2D video recording 134 of the subject user 130 performing the physical activity and provides a 3D visualization comprising a virtual avatar performing the physical activity, where the 3D visualization is based on the received 3D motion capture data 144. Synchronization engine 112 causes display (e.g., on display device 114 of computing device 110 or on a display device of some other device connected to network 130) of the 3D visualization comprising the virtual avatar at a first key point in performing the physical activity. The first key point may be one of a plurality of key points defined for the physical activity, where each of the plurality of key points comprises a recognizable position of at least one body part of the subject user 130 or object being manipulated by the subject user 130 while performing the physical activity. For example, a key point in a physical activity may include the shaft of a golf club being parallel to the ground during the backswing, the lead forearm of the subject user 130 being parallel to the ground during a baseball swing, the lead foot of the subject user 130 striking the ground during throwing a football, etc.

Synchronization engine 112 may further receive first user input to advance the 2D video recording 134 to a first position corresponding the first key point and receive second user input comprising a first synchronization command. In response, the synchronization engine 112 can generate a first synchronization marker to indicate the first position in the 2D video recording 134 corresponding to the first key point. In one embodiment, the first synchronization marker is stored as part of synchronization data 122 in repository 120.

The repository 120 is a persistent storage that is capable of storing synchronization data 122, as well as data structures to tag, organize, and index this data. Repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110 or may be directly attached to computing device 110. In some implementations, repository 120 may be a network-attached file server, while in other embodiments, repository 120 may be some other type of persistent storage such as an object-oriented database, a relational database, and so forth, that may be hosted by a server machine or one or more different machines coupled to the via the network 130.

Figure 2:
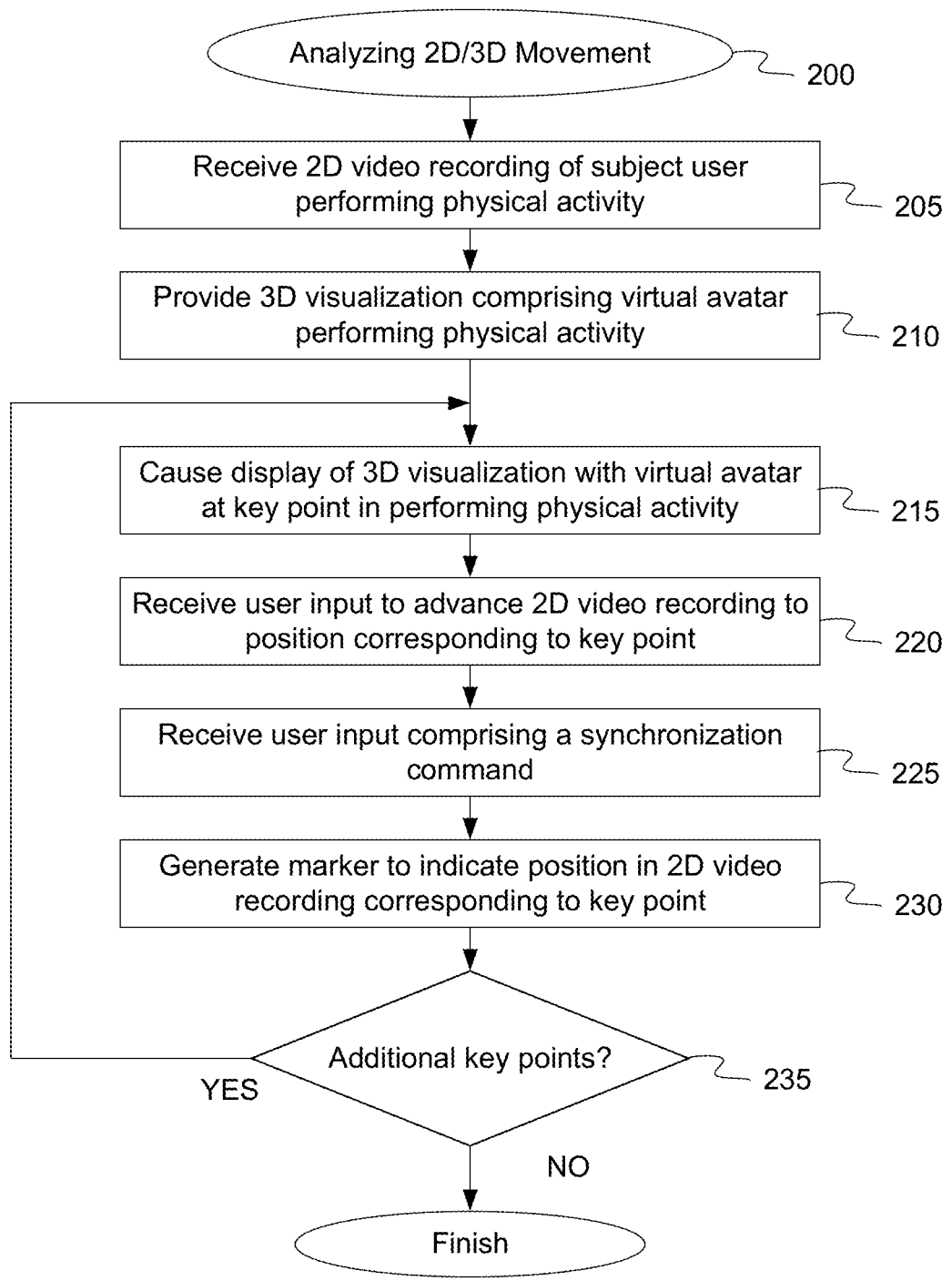
FIG. 2 is a flow diagram illustrating method of analyzing 2D movement in comparison with a 3D avatar in accordance with one or more aspects of the present disclosure.

FIG. 2 is a flow diagram illustrating method of analyzing 2D movement in comparison with a 3D avatar in accordance with one or more aspects of the present disclosure. The method 200 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 200 may be performed by computing device 110 including synchronization engine 112, as shown in FIG. 1.

Referring to FIG. 2, at block 205, method 200 receives a two dimensional (2D) video recording 134 of a subject user 130 performing a physical activity. In one embodiment, camera 132 captures the 2D video recording 134 of subject user 130 performing the physical activity. The physical activity can be for example, swinging a golf club, throwing a ball, running, walking, jumping, sitting standing, or any other physical activity.

Figure 4A:
FIGS. 4A and 4B illustrate a 3D visualization comprising a virtual avatar overlaid on a 2D video recording of a user performing a physical activity in accordance with one or more aspects of the present disclosure.

At block 210, method 200 provides a three dimensional (3D) visualization comprising a virtual avatar performing the physical activity. FIG. 4A illustrates one example of a 3D visualization 400 showing both a down-the-line view and a face-on view of a virtual avatar 410 performing the physical activity (in this case swinging a golf club). A 2D video 420 of the subject user is also included. In one embodiment, the 3D visualization 400 is based on 3D motion capture data 144 corresponding to one or more target users 140 performing the physical activity. The 3D motion capture data 144 can include one or more of positional data, rotational data, or acceleration data measured by a plurality of motion capture sensors. The one or more target users 140 share one or more attributes with the subject user 130, such as physical characteristics associated with the subject user, the physical characteristics comprising at least one of an age, height, weight, or gender of the subject user 130, or a range of motion or a functional movement associated with the subject user 130. The range of motion data may define, for example, how far the subject user 130 can rotate a particular joint, and the functional movement data may indicate, for example, how well the subject user 130 can perform certain standardized body movements.

Figure 4B:
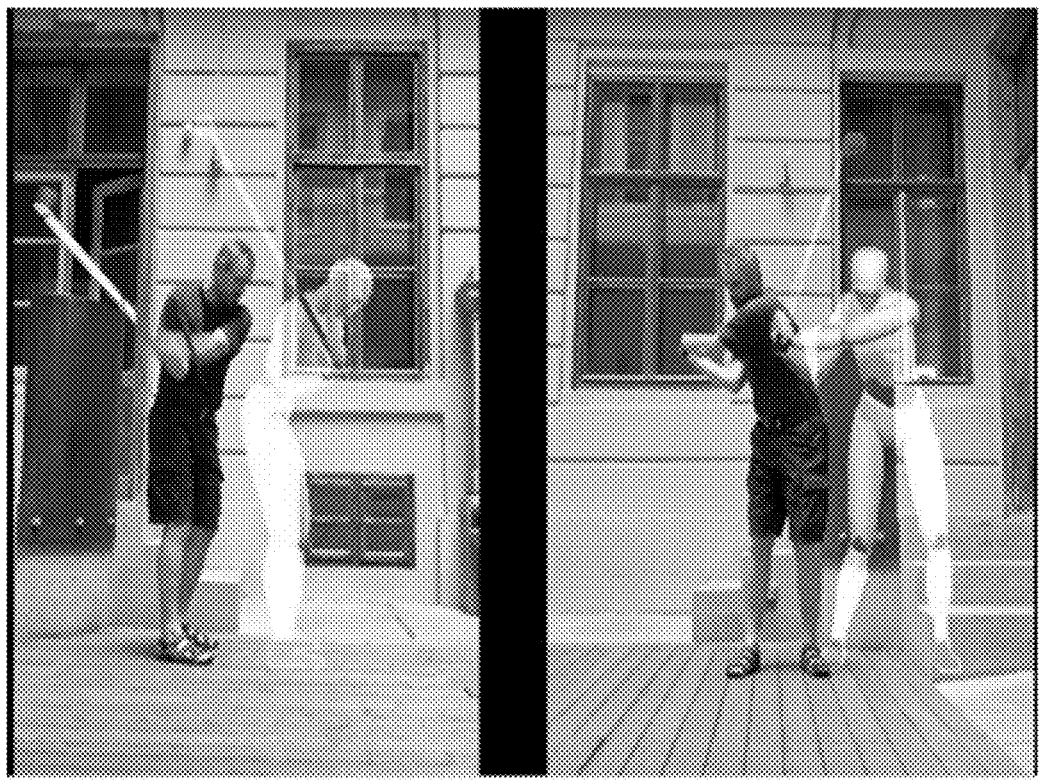

At block 215, method 200 causes display of the 3D visualization comprising the virtual avatar at a first key point in performing the physical activity. In one embodiment, the first key point comprises a recognizable position of at least one body part of the subject user or object being manipulated by the subject user while performing the physical activity. The first key point may be one of a plurality of key points defined for the physical activity, where each of the plurality of key points comprises a recognizable position of at least one body part of the subject user 130 or object being manipulated by the subject user 130 while performing the physical activity. For example, a key point in a physical activity may include the shaft of a golf club being parallel to the ground during the backswing, the lead forearm of the subject user 130 being parallel to the ground during a baseball swing, the lead foot of the subject user 130 striking the ground during throwing a football, etc. As shown in FIG. 4A, a key point is illustrated where the virtual avatar 400 is at address and has not begun swinging the golf club. As shown in FIG. 4B, another key point is illustrated when the left arm of the virtual avatar 400 is parallel to the ground.

At block 220, method 200 receives first user input to advance the 2D video recording 134 to a first position corresponding the first key point. In one embodiment, a user may use controls presented on display device 114 or via some other input mechanism to advance the 2D video recording 134 to the first position where the subject user 130 in the 2D video recording is at the same key point (e.g., at address as shown in FIG. 4A or where the left arm of the subject user 130 is parallel to the ground as shown in FIG. 4B) as the virtual avatar 410 in the 3D visualization 400.

At block 225, method 200 receives second user input comprising a first synchronization command. In one embodiment, there is a button presented on display device 114 by which the user can input the synchronization command. In other embodiments, the synchronization command may be received via some other input mechanism. In either case, the synchronization command includes an indication that the 2D video recording 134 is at a position (e.g., a time within the recording) where the subject user 130 in the 2D video recording is at the same key point as the virtual avatar 410.

At block 230, method 200 generates a first synchronization marker to indicate the first position in the 2D video recording corresponding to the first key point. In one embodiment, the synchronization marker includes an entry in a database, table, data store etc. of synchronization data 122. The entry may include, for example, a timestamp or other indication of the first position in the 2D video recording and an indication of the corresponding key point (e.g., a unique key point name, number or other identifier). In other embodiment, the synchronization marker includes metadata associated and stored with the 2D video recording itself.

At block 235, method 200 determines whether there are additional key points associated with the 3D visualization. If so, method 200 returns to block 215 and performs the operations at blocks 215-230 for each additional key point. In this manner, synchronization engine 112 may perform a synchronization operation for each of the key points defined for the particular motion being performed, such that the 3D avatar at each of the key points is synchronized with a corresponding position in the 2D video recording 134. Synchronization engine 112 can maintain this information as synchronization data 122 for later use described in more detail below with respect to FIG. 3.

Figure 3:
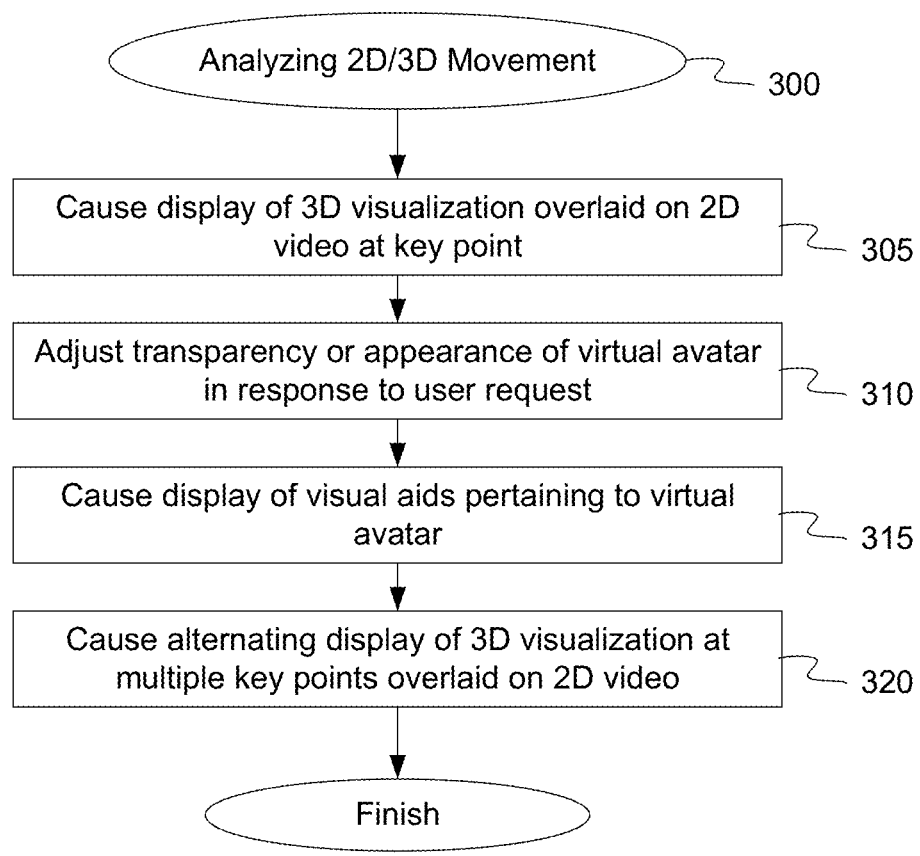
FIG. 3 is a flow diagram illustrating method of analyzing 2D movement in comparison with a 3D avatar in accordance with one or more aspects of the present disclosure.

FIG. 3 is a flow diagram illustrating method of analyzing 2D movement in comparison with a 3D avatar in accordance with one or more aspects of the present disclosure. The method 300 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 300 may be performed by computing device 110 including synchronization engine 112, as shown in FIG. 1.

Referring to FIG. 3, at block 305, method 300 causes display of the 3D visualization comprising the virtual avatar at the first key point in performing the physical activity overlaid on the 2D video at the first position in the 2D video recording indicated by the first synchronization marker. FIG. 4A illustrates how the 3D avatar 410 can be overlaid on the 2D video 420 where the 3D avatar 410 and the image of the subject user 130 are at the same key point in performing the physical activity (i.e., at address before beginning the golf swing).

Figure 5A:
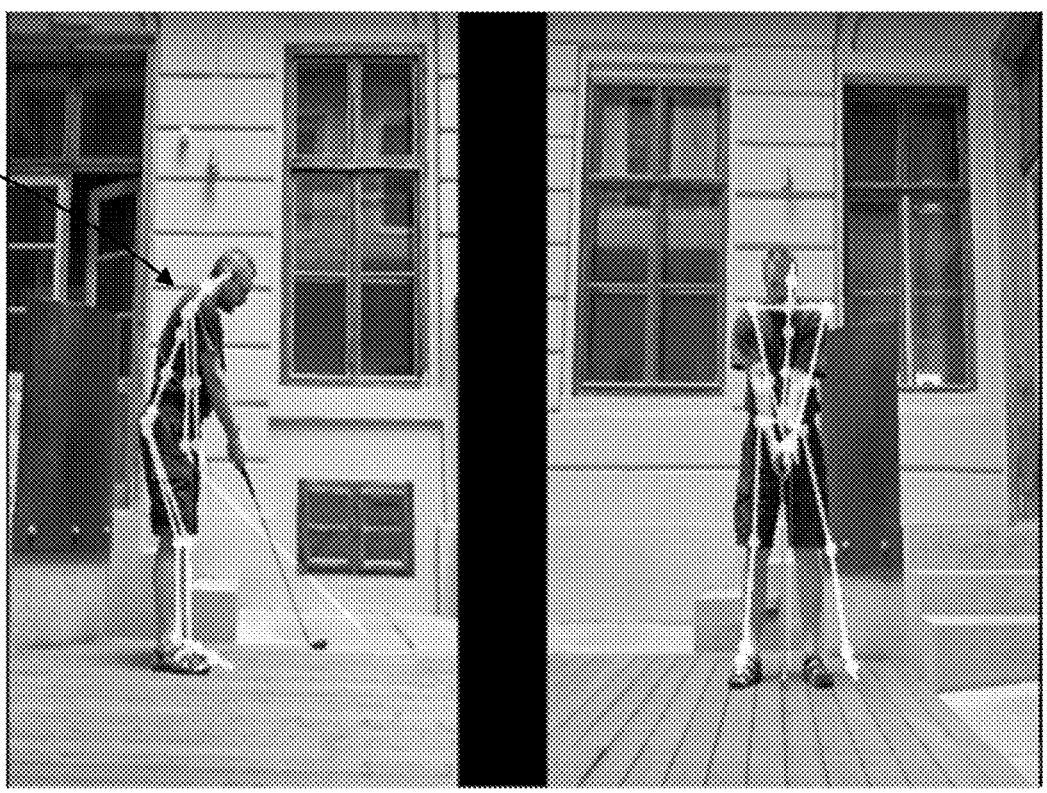
FIGS. 5A and 5B illustrate a 3D visualization comprising a skeleton avatar overlaid on a 2D video recording of a user performing a physical activity in accordance with one or more aspects of the present disclosure.
Figure 5B:
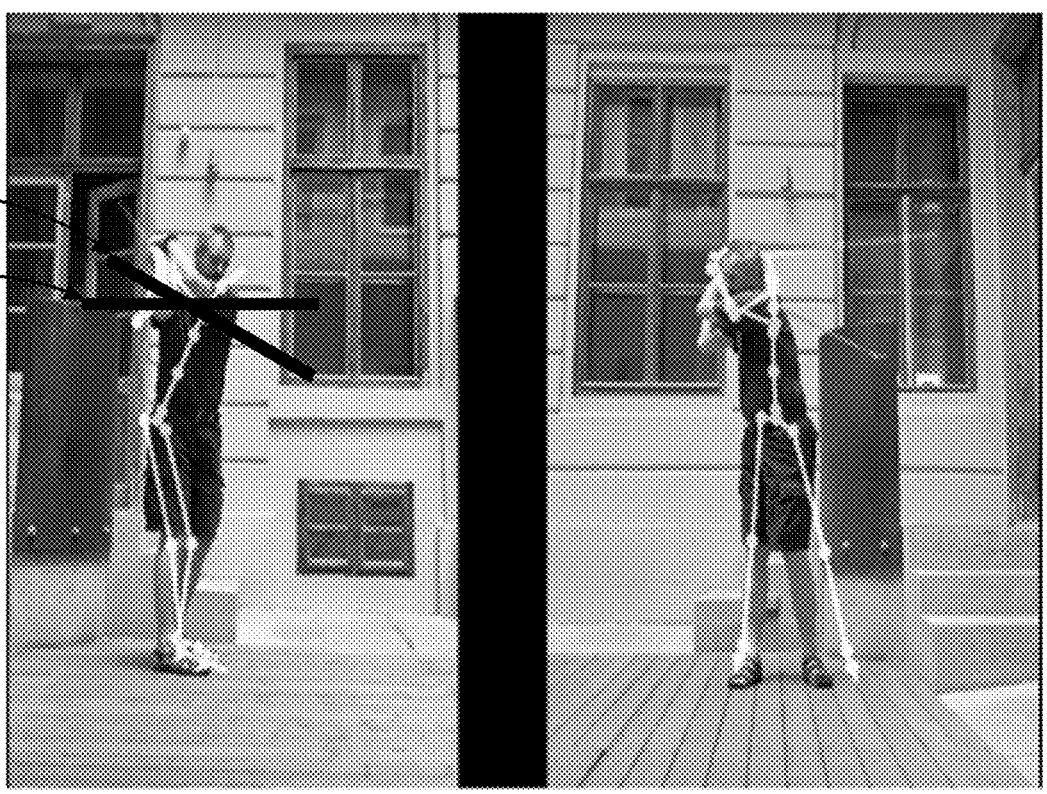

At block 310, method 300 adjusts at least one of a transparency or appearance of the virtual avatar in response to a user request. Depending on the embodiment, the 3D avatar 410 can be rotated or shifted horizontally or vertically to avoid obscuring the 2D video recording 420. In one embodiment, synchronization engine 112 can adjust the transparency of the virtual avatar 410 to make it more or less transparent/opaque to improve the comparison with and visibility of the 2D video recording 420. In one embodiment, synchronization engine 112 can display the 3D avatar in the skeleton mode, as illustrated in FIGS. 5A and 5B. In this view, synchronization engine 112 provides a skeletal model of the 3D avatar which differentiates well on a 2D human figure in a video recording without blocking the 2D video recording out. As shown in FIG. 5A, a key point is illustrated where the skeleton avatar 510 is at address and has not begun swinging the golf club. As shown in FIG. 5B, another key point is illustrated when skeleton avatar 510 is at the top of the backswing and has not begun the transition to the downswing.

At block 315, method 300 causes display of one or more visual aids pertaining to the virtual avatar. In one embodiment, synchronization engine 112 provides data and/or visualization tools on the 3D avatar to provide for better analysis and training. For example, extension lines on body parts such as the hips and shoulder with rotation angles may be displayed, velocity, force, or acceleration lines on body segments may be displayed indicating the magnitude and direction of the velocities, or paths created by body parts or apparatus during performance of a motion may be displayed. In one embodiment, the system may hide or highlight different body parts on the 3D model to make the comparison more clear. For example, in FIG. 5B, a first line 512 shows the angle of the shoulders of the skeleton avatar 510, while a second line 514 shows the angle of the shoulders of the subject user in the 2D video recording. The first and second lines 512 and 514 make for easy comparison of the relative angles.

At block 320, method 300 causes alternating display of the 3D visualization comprising the virtual avatar at a plurality of key points in performing the physical activity overlaid on the 2D video at a corresponding plurality of positions in the 2D video recording indicated by a corresponding plurality of synchronization markers, the plurality of key points comprising at least the first key point and the second key point. In one embodiment, synchronization engine 112 can step through each of the plurality of key points to display the synchronized 3D avatar and position in the 2D video recording. For example, the system may first display the depiction from FIG. 4A and then the description from FIG. 4B, etc. Synchronization module 112 may switch between the key points automatically at a periodic interval or may switch in response to user input. In another embodiment, synchronization module 112 may play the 2D video recording along with the 3D visualization to allow for a comparison in the tempo of performing the physical activity.

Figure 6:
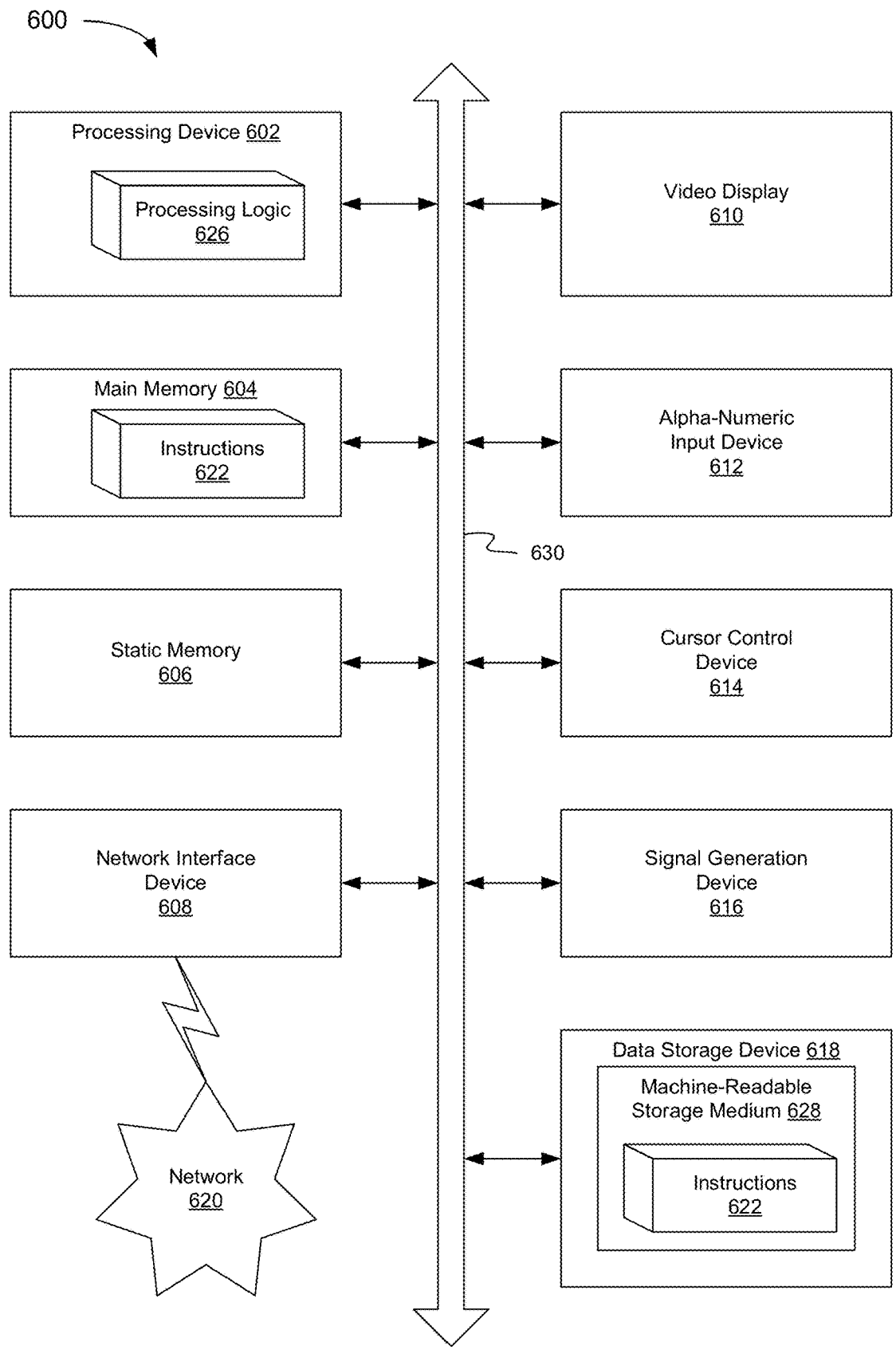
FIG. 6 depicts an example computer system which can perform any one or more of the methods described herein, in accordance with one or more aspects of the present disclosure.

FIG. 6 depicts an example computer system 600 which can perform any one or more of the methods described herein, in accordance with one or more aspects of the present disclosure. In one example, computer system 600 may correspond to a computing device, such as computing device 110, capable of executing synchronization engine 112 of FIG. 1. The computer system 600 may be connected (e.g., networked) to other computer systems in a LAN, an intranet, an extranet, or the Internet. The computer system 600 may operate in the capacity of a server in a client-server network environment. The computer system 600 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker). In one illustrative example, the video display unit 610, the alphanumeric input device 612, and the cursor control device 614 may be combined into a single component or device (e.g., an LCD touch screen).

The data storage device 618 may include a computer-readable medium 628 on which the instructions 622 (e.g., implementing synchronization engine 112) embodying any one or more of the methodologies or functions described herein is stored. The instructions 622 may also reside, completely or at least partially, within the main memory 604 and/or within the processing device 602 during execution thereof by the computer system 600, the main memory 604 and the processing device 602 also constituting computer-readable media. The instructions 622 may further be transmitted or received over a network via the network interface device 608.

While the computer-readable storage medium 628 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
receiving a previously recorded two dimensional (2D) video of a subject user performing a physical activity;
providing a three dimensional (3D) visualization comprising a virtual avatar performing the physical activity;
causing display of the 3D visualization comprising the virtual avatar at a plurality of key points in performing the physical activity;
receiving, via a first control presented on a display device, first user input to advance the 2D video recording to a plurality of positions corresponding the plurality of key points;
receiving, via a second control presented on the display device, second user input comprising a plurality of respective synchronization commands corresponding to the plurality of key points;
generating, by a processing device, a plurality of synchronization markers to indicate the plurality of positions in the 2D video corresponding to the plurality of key points;
storing the plurality of synchronization markers in synchronization data associated with the 2D video; and
subsequent to receiving the plurality of respective synchronization commands, sequentially causing display of the 3D visualization comprising the virtual avatar at the plurality of key points in performing the physical activity overlaid on the 2D video at the corresponding plurality of positions in the 2D video recording indicated by the plurality of synchronization markers stored in the synchronization data associated with the 2D video.

2. The method of claim 1, wherein the 3D visualization is based on 3D motion capture data corresponding to one or more target users performing the physical activity.

3. The method of claim 2, wherein the 3D motion capture data comprises one or more of positional data, rotational data, or acceleration data measured by a plurality of motion capture sensors.

4. The method of claim 2, wherein the one or more target users share one or more attributes with the subject user.

5. The method of claim 4, wherein the one or more attributes comprise physical characteristics associated with the subject user, the physical characteristics comprising at least one of an age, height, weight, or gender of the subject user.

6. The method of claim 4, wherein the one or more attributes comprise at least one of a range of motion or a functional movement associated with the subject user.

7. The method of claim 1, wherein each of the plurality of key points comprises a respective position of at least one body part of the subject user or object being manipulated by the subject user while performing the physical activity.

8. The method of claim 1, further comprising:
adjusting at least one of a transparency or appearance of the virtual avatar in response to a user request.

9. The method of claim 1, further comprising:
causing display of one or more visual aids pertaining to the virtual avatar.

10. A system comprising:
a memory device storing instructions;
a processing device coupled to the memory device, the processing device to execute the instructions to:
receive a previously recorded two dimensional (2D) video of a subject user performing a physical activity;
provide a three dimensional (3D) visualization comprising a virtual avatar performing the physical activity;
cause display of the 3D visualization comprising the virtual avatar at a plurality of key points in performing the physical activity;
receive, via a first control presented on a display device, first user input to advance the 2D video recording to a plurality of positions corresponding the plurality of key points;
receive, via a second control presented on a display device, second user input comprising a plurality of respective synchronization commands corresponding to the plurality of key points;
generate a plurality of synchronization markers to indicate the plurality of positions in the 2D video corresponding to the plurality of key points; and
store the plurality of synchronization markers in synchronization data associated with the 2D video; and
subsequent to receiving the plurality of respective synchronization commands, sequentially cause display of the 3D visualization comprising the virtual avatar at the plurality of key points in performing the physical activity overlaid on the 2D video at the corresponding plurality of positions in the 2D video recording indicated by the plurality of synchronization markers stored in the synchronization data associated with the 2D video.

11. The system of claim 10, wherein each of the plurality of key points comprises a respective position of at least one body part of the subject user or object being manipulated by the subject user while performing the physical activity.

12. A non-transitory computer-readable storage medium storing instructions that, when executed by a processing device, cause the processing device to:
receive a previously recorded two dimensional (2D) video of a subject user performing a physical activity;
provide a three dimensional (3D) visualization comprising a virtual avatar performing the physical activity;
cause display of the 3D visualization comprising the virtual avatar at a first key point in cause display of the 3D visualization comprising the virtual avatar at a plurality of key points in performing the physical activity;
receive, via a first control presented on a display device, first user input to advance the 2D video recording to a plurality of positions corresponding the plurality of key points;

receive, via a second control presented on a display device, second user input comprising a plurality of respective synchronization commands corresponding to the plurality of key points;

generate a plurality of synchronization markers to indicate the plurality of positions in the 2D video corresponding to the plurality of key points; and store the plurality of synchronization markers in synchronization data associated with the 2D video; and subsequent to receiving the plurality of respective synchronization commands, sequentially cause display of the 3D visualization comprising the virtual avatar at the plurality of key points in performing the physical activity overlaid on the 2D video at the corresponding plurality of positions in the 2D video recording indicated by the plurality of synchronization markers stored in the synchronization data associated with the 2D video.

13. The non-transitory computer-readable storage medium of claim 12, wherein each of the plurality of key points comprises a respective position of at least one body part of the subject user or object being manipulated by the subject user while performing the physical activity.

* * * * *